July 31, 1956  E. B. NOEL ET AL  2,757,318
RECTIFYING CIRCUIT FOR DISCHARGE LAMPS
Filed May 18, 1953

Inventors:
Edward B. Noel,
Ralph E. Farnham,
by Vernet C. Kauffman
Their Attorney.

United States Patent Office 2,757,318
Patented July 31, 1956

2,757,318
RECTIFYING CIRCUIT FOR DISCHARGE LAMPS

Edward B. Noel, Cleveland Heights, and Ralph E. Farnham, Lyndhurst, Ohio, assignors to General Electric Company, a corporation of New York Application May 18, 1953, Serial No. 355,518

3 Claims. (Cl. 315—205)

This invention relates to a direct current operating circuit for electric discharge lamps and more particularly to an operating circuit obtaining direct current by rectification from an alternating current supply.

The present circuit is intended primarily for use with high pressure mercury vapor lamps in circumstances where, for one reason or another, it is necessary to operate the lamp on direct current in order to eliminate the cyclic flicker and resultant stroboscopic effects which inevitably occur when a single such lamp is operated on alternating current. Examples of lamps with which the invention has proved useful are the high pressure mercury vapor lamps known commercially under the designations H85, H100, H250, and H400 (the numeral indicating the watts rating. There are a considerable number of applications for such lamps where cyclic flicker cannot be tolerated. Among these applications might be mentioned the use of such lamps as sources of light rich in ultraviolet radiation for material inspecting or counting operations, for instance to energize a photocell in card-sorting machines. It will readily be appreciated that in such a use, were a perforated card to be positioned before the lamp at the instant of extinction in the A. C. cycle, the card would remain undetected, resulting in faulty operation of the machine.

The object of the invention is to provide a new and improved circuit for operating an electric discharge lamp on direct current from an alternating source.

Another object of the invention is to provide a highly efficient direct current operating circuit for an electric discharge lamp which avoids the use of a resistive ballast.

Yet another object is to provide an operating circuit for an electric discharge lamp obtaining direct current by rectification from the usual commercial A. C. supply and making use of substantially the same transformer as is used in alternating current operation of the lamp and allowing adjustment of the lamp current.

In the illustrated embodiment of the invention, the operating circuit includes an autotransformer having sufficient leakage reactance to provide a volt-ampere output characteristic drooping more than the negative resistance characteristic of the lamp. A four-element bridge rectifier has one diagonal connected across the secondary output circuit of the transformer. A capacitance is connected across the other diagonal of the bridge rectifier and the lamp is also connected, in series with a smoothing choke or inductance, across this other diagonal. Due to the presence of the capacitor, the bridge rectifier provides across the electrodes of the lamp at starting, a direct voltage which is greater than the root-mean-square (R. M. S.) alternating output voltages of the autotransformer and which is substantially equal to its peak A. C. voltage under open circuit conditions. A more than ample direct voltage is thus available to start the lamp. During operation, the leakage reactance of the autotransformer on the A. C. side of the circuit provides a drooping volt-ampere characteristic in the rectified output voltage on the D. C. side of the circuit. Economical regulation of the discharge current through the lamp is thereby achieved without the use of a resistance element with its attendant reduction in efficiency. Furthermore, the current through the lamp may be adjusted, within limits, by varying the size of the capacitor.

For further objects and advantages and for a better understanding of the invention, attention is now directed to the following description and accompanying drawing. The features of the invention believed to be novel will be more particularly pointed out in the appended claims.

The invention will be described with reference to a high pressure mercury discharge lamp of 100 watts rating and designated commercially H100–A4. The illustrated values of circuit components likewise refer to a circuit suitable for this same lamp. It is to be understood, however, that this particular lamp and these specific values are given by way of illustrative example. In general, the invention is applicable to discharge lamps having a negative resistance characteristic and requiring at starting a higher voltage than during normal operation.

Figure 1:
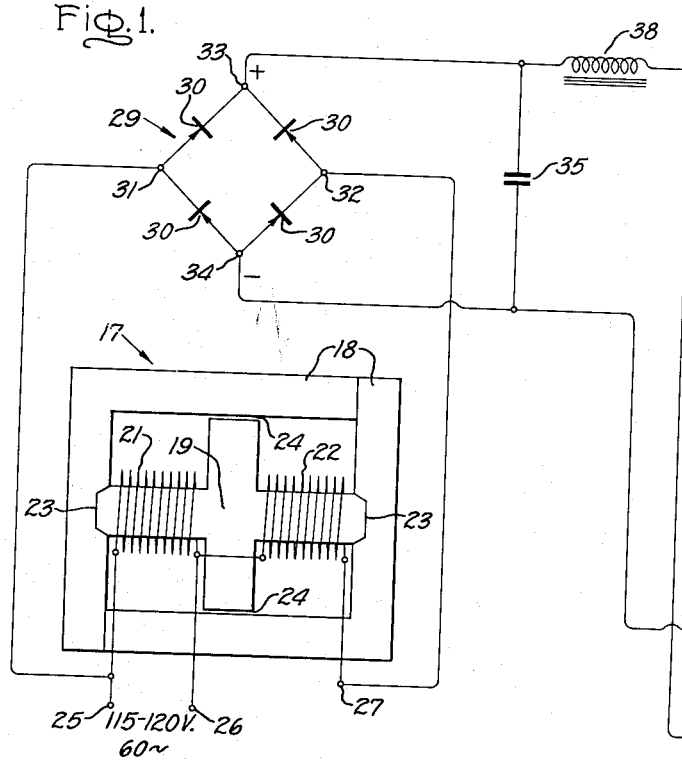
Fig. 1 is a schematic diagram of a D. C. operating circuit for a high pressure mercury vapor lamp and embodying our invention.

Referring to Fig. 1, there is shown a high pressure mercury vapor lamp 1 comprising an inner arc tube 2 which constitutes the discharge lamp proper, and an outer glass envelope 3 serving as a protective jacket for the arc tube. Sealed into opposite ends of the arc tube are a pair of thermionic electrodes 4, 5 each comprising a tungsten lead surrounded at its end by a wire helix enclosing a small sliver of thorium metal which serves to reduce the cathode drop during operation. The arc tube is filled with a quantity of mercury which is completely vaporized with a pressure of the order of one-half to several atmospheres during operation. It contains in addition a small quantity of a rare gas, for instance argon at 3 mm. pressure, to facilitate starting.

The outer glass jacket is provided with an admedium screw base 6 and the arc tube is supported within the jacket by uprights 7, 8. Upper electrode 5 is connected through upright 7 and lead-in wire 9 to the shell 10 of the base, while lower electrode 4 is connected through lead-in wire 11 to end contact 12 of the base. The arc tube contains in addition an auxiliary starting electrode 13 which is permanently connected by a resistor 14, of the order of 10,000 to 40,000 ohms, to the opposite main electrode 5.

The operation of the lamp is initiated by a glow discharge between starting electrode 13 and main electrode 4 adjacent thereto when a sufficiently high voltage is applied across the terminals of the lamp, that is, between the end contact 12 and shell 10 of the base. In the case of the H100–A4 lamp, the starting voltage may be as high as 275 volts and occasionaly 300 volts. After ionization has been initiated, it spreads throughout the arc tube and very quickly thereafter conduction starts between the main electrodes 4 and 5. The main electrodes become heated to thermionic emission and the glow discharge thereupon changes over into an arc discharge. At first the arc discharge is at a relatively high current and low voltage drop, for instance 25 volts. However, as the temperature of the arc tube increases and the vapor pressure of mercury within it builds up, the discharge is gradually constricted and the current decreases while the voltage drop increases to an intermediate value. For instance, the normal operating voltage drop across the lamp on alternating current may be 140 volts R. M. S. and the operating current may be 0.9 ampere R. M. S. Reference may be made to Patent 2,611,883, Noel, for a more complete description of high pressure mercury vapor lamps of this type.

The operating circuit in accordance with the invention comprises a high reactance autotransformer 17 including a rectangular core 18 forming a closed magnetic circuit and an inner cruciform spider 19. A primary winding 21 and a secondary winding 22 are wound on the main branch or leg of the spider and on opposite sides, respectively, of the shorter transverse leg. The main leg of the spider abuts tightly at 23 against the outer core member 18, whereas the shorter transverse leg is spaced from the core member 18 by air gaps at 24.

Figure 2:
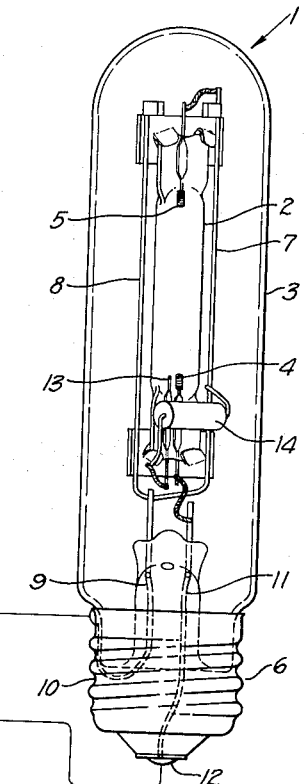
Fig. 2 is a graph illustrating the volt-ampere characteristics of the autotransformer and of the rectifying circuit of Fig. 1.
Figure 2:
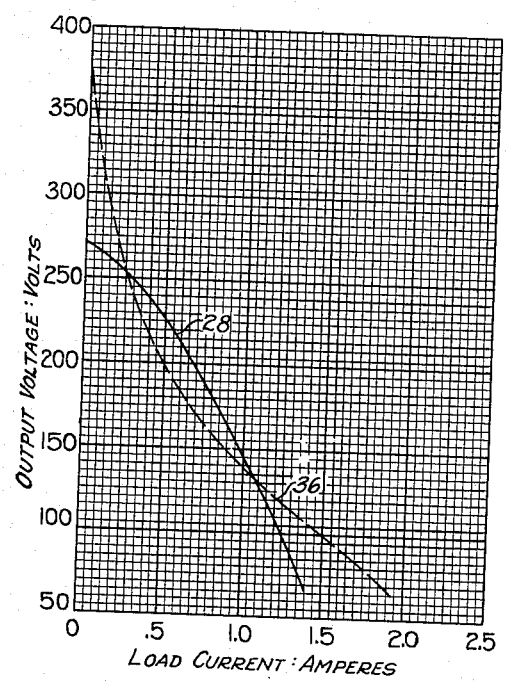

The autotransformer is energized by applying the usual 115–120 volt 60-cycle commercial supply voltage across the primary at terminals 25, 26. The output voltage is taken across terminals 25 and 27, thereby including both the primary and secondary voltages in series. The transformer construction which has been described assures a high leakage reactance between the primary and secondary windings whereby the output voltage has a drooping volt-ampere characteristic. This is illustrated by the solid line curve 28 in Fig. 2 which has been plotted to show R. M. S. voltage. The falling off in output voltage with increasing current is due to the shunting of an increasingly greater amount of magnetic flux through the transverse leg of the core and across air gaps 24 as the secondary current increases. It will be appreciated that the transformer structure which has been described is to be taken as illustrative and other known arrangements whereby high leakage reactance may be provided in a transforming means may likewise be used.

The output voltage of transformer 17 is supplied across one diagonal of a four-element bridge rectifier 29, that is at junction points 31, 32. The bridge rectifier has been conventionally illustrated and its rectifying elements 30 may consist of copper oxide or selenium rectifiers, or alternatively, of diode-type rectifiers. It will be understood that where diode tubes are used for the rectifier elements, the usual provision must be made of a transformer having suitable windings to provide filament heating current for the cathodes of the tubes.

Across the direct current or output diagonal of bridge 29, that is across terminals 33, 34, we connect a capacitance 35. During normal operation, the capicitance operates as a filter to smooth out the alternating current ripple in the direct current output of the rectifier. However, at starting the capacitor has another important function and that is to charge to the peak of the applied alternating voltage. It will be appreciated that the peak value of a sine wave is 1,414 times the R. M. S. value. Since previous to the beginning of conduction through the lamp, the leakage reactance of the autotransformer does not limit the output voltage, the A. C. voltage applied across the bridge rectifier is equal to the open circuit voltage of the autotransformer. Hence, the rectifier may charge up to the peak of the open circuit alternating voltage of the transformer in order to start the lamp. For the same transformer whose A. C. volt-ampere output characteristic across a resistive load is illustrated by solid line curve 28 in Fig. 2, the resultant D. C. output volt-ampere characteristic, likewise across a resistive load, is illustrated by dashed line curve 36. It will be observed that for zero load current, when the open circuit R. M. S. secondary alternating voltage of the transformer is 265 volts, the rectified D. C. voltage across capacitor 35 is 375 volts, that is substantially 1.414 times the former.

The lamp will normally start at some voltage less than the peak of the A. C. secondary voltage. Accordingly, when the circuit is first energized, the capacitor will begin to charge, but before reaching the peak at 375 volts, conduction will start in the lamp and the condenser will discharge to a low value, for instance 25 volts. As the lamp warms up, the mercury vapor pressure rises and the voltage drop across the lamp increases, for instance to 140 volts, and the lamp load current simultaneously decreases to approximately 0.8 ampere.

Thus, in accordance with our invention, the use of a capacitor across the output diagonal of the bridge rectifier assures a starting voltage of substantially the same value as the peak A. C. secondary no-load output voltage of the transformer. The use of a high leakage reactance transforming means on the A. C. side of the circuit assures regulation of the lamp without any ballasting resistance on the D. C. side of the circuit. It will be observed the D. C. output volt-ampere characteristic is a decidedly drooping one. The leakage reactance of the autotransformer is great enough to cause the D. C. volt-ampere characteristic to droop more than the volt-ampere or negative resistance characteristic of the lamp, and the lamp load current is thus stabilized.

Figure 3:
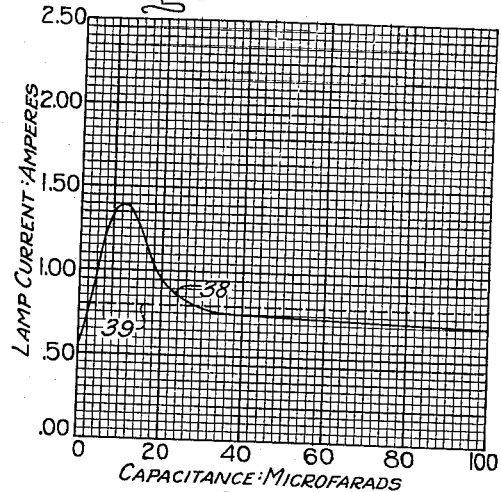
Fig. 3 is a graph illustrating the variation in lamp discharge current in relation to the value of the filter capacitance.

According to a further feature of our invention, the D. C. lamp load current is determined by the value of capacitance 35. Due to the inductive reactance of autotransformer 17, capacitance 35 may be chosen to produce a resonant effect resulting in a rise in the secondary output current. This effect is illustrated in Fig. 3, wherein curve 38 shows the variation in D. C. lamp operating current for various values of capacitance 35. The peak in lamp current, with the circuit components which have been described, occurs at approximately 10 microfarads, the lamp current then being 1.4 amperes.

Evidently, the resonance capacitance of 10 microfarads, produces too high a lamp current. The value of capacitance 35 is selected to cause the D. C. operating point to produce the same lumens output from the lamp as would be had with A. C. operation of the lamp from autotransformer 17. This point occurs with a load current of approximately 0.8 ampere, denoted by dashed line 39 in Fig. 3. The current is deliberately set at a slightly lower figure than on A. C. operation, because the efficiency of the lamp is slightly higher on D. C. It will be observed that lamp current curve 38 intersects line 39 at two points. In other words, there are two values of capacitance which produce the desired current. The first value at approximately 1.5 microfarads is less than the resonance value. It has the disadvantage of excessive steepness which means poor regulation. Furthermore, though it is adequate for regulation after the lamp is started, it is less than the minimum capacitance required to produce enough peak voltage current to start the lamp. Therefore, the other value of capacitance is selected, namely 28 microfarads, which is greater than the resonance capacitance. This value of capacitance results in a D. C. volt-ampere output characteristic similar to that illustrated by curve 36 in Fig. 2.

The discharge lamp 1 is connected across the output diagonal of the bridge rectifier, that is across terminals 33, 34, and in parallel with capacitance 35. Preferably a smoothing reactor or inductance 41 is connected in series with the lamp across the output diagonal of the bridge. We have found it advisable, when operating mercury lamps of the present type on direct current from rectifying systems, to employ an inductance as the terminating element in the filter system, because if the filter is terminated capacitively, objectionable oscillations may occur.

It will be appreciated that the invention permits the use, in a rectifying D. C. operating circuit for a discharge lamp, of the same transforming means, in this instance a high leakage reactance autotransformer, as is normally supplied for alternating current operation of the same lamp. From a commercial standpoint, this is a very important and highly advantageous feature as it permits the same transformer unit to be supplied to the customer irrespectively of how the lamp is intended to be used.

The circuit in accordance with our invention has the added advantage that the efficiency of operation of the lamp remains substantially as high as when the lamp is operated on alternating current directly from the autotransformer. This results from the fact that no additional resistance is required on the direct current side of the circuit to operate as a ballast, the leakage reactance of autotransformer 17 on the alternating current side of the circuit serving to stabilize the current, and the value of capacitance 35 serving to determine the D. C. operating point.

While a certain specific embodiment of the invention has been shown and described, it will, of course, be appreciated that it is intended as illustrative of the invention only. The circuit elements may be modified in value to suit various sizes of lamps and other modifications in circuit details, such as the structure of the transforming means or the nature of the rectifying elements making up the bridge rectifier, will readily occur to those skilled in the art. The appended claims are therefore intended to cover any such modifications coming within the true spirit and scope of the invention.

What we claim as new and desire to secure by Letters Patent of the United States is:

1. In combination, an electric discharge lamp having a negative resistance characteristic and requiring a starting voltage greater than its operating voltage drop, an alternating voltage source of a given frequency, transforming means connected across said source and including an output circuit having inductive leakage reactance resulting in a volt-ampere output characteristic drooping more than the negative resistance characteristic of said lamp, a four-element bridge rectifier having diagonally arranged input and output terminals, said input terminals being connected across said output circuit, said inductive leakage reactance of itself operating to limit the lamp current below its rated value, a capacitance connected across the output terminals of said bridge rectifier, said capacitance being greater than the resonance capacitance for said leakage reactance at said frequency and proportioned to raise the lamp current to its rated value, and means connecting said lamp across said output terminals.

2. In combination, an electric discharge lamp having a negative resistance characteristic and requiring a starting voltage greater than its operating voltage drop, an alternating voltage source of a given frequency, an autotransformer having a primary winding connected across said source and a secondary winding magnetically coupled to said primary winding with a high leakage reactance therebetween, said secondary winding being connected in series with said primary winding to constitute an output circuit, said windings being proportioned to produce an open circuit voltage greater than the starting voltage of said lamp and said leakage reactance being proportioned to provide an output volt-ampere characteristic drooping more than the negative resistance characteristic of said lamp, said inductive leakage reactance of itself operating to limit the lamp current below its rated value, a four-element bridge rectifier having diagonally arranged input and output terminals, said input terminals being connected across said output circuit, a capacitance connected across the output terminals of said bridge rectifier, said capacitance being greater than the resonance capacitance for said reactance at said frequency and proportioned to raise the lamp current to its rated value, and means including a series inductance connecting said lamp across said output terminals.

3. In combination, a mercury vapor discharge lamp having a negative resistance characteristic and requiring a starting voltage greater than its operating voltage drop, an alternating voltage source of a given frequency, an autotransformer having a primary winding connected across said source and a secondary winding magnetically coupled to said primary winding with high leakage reactance therebetween and serially connected therewith to constitute an output circuit, said windings being proportioned to produce an open circuit voltage greater than the starting voltage of said lamp and said leakage reactance being proportioned to provide an output volt-ampere characteristic drooping more than the negative resistance characteristic of said lamp, said inductive leakage reactance of itself operating to limit the lamp current below its rated value, a four-element bridge rectifier having diagonally arranged input and output terminals, said input terminals being connected across said output circuit, a capacitance connected across the output terminals of said bridge rectifier, said capacitance being greater than the resonance capacitance for said reactance at said given frequency and proportioned to place the D. C. operating point of said lamp at a value providing substantially the same lumens output as obtained by A. C. operation of said lamp from said autotransformer, and means including a series inductance connecting said lamp across said output terminals.

References Cited in the file of this patent

UNITED STATES PATENTS

| 1,764,283 | Strong | June 17, 1930 |
| 1,984,503 | Uyterhoeven et al. | Dec. 18, 1934 |
| 2,351,616 | Karash et al. | June 20, 1944 |

FOREIGN PATENTS

| 279,680 | Great Britain | Nov. 3, 1927 |